Figure 3:
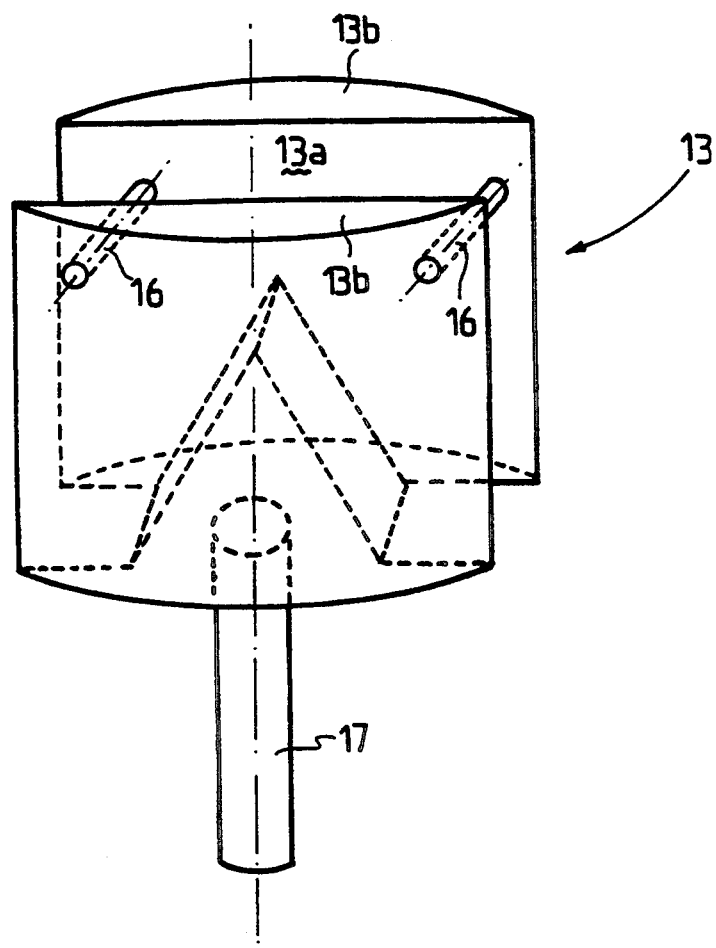

United States Patent [19]

Roudaut

[11] Patent Number: 5,383,697
[45] Date of Patent: Jan. 24, 1995

[54] PNEUMATIC PINCERS

[76] Inventor: Philippe Roudaut, 142, rue du General Leclerc, 95120 Ermont, France

[21] Appl. No.: 945,956

[22] Filed: Sep. 16, 1992

[51] Int. Cl.⁶ .......................... B25J 15/08; B66C 1/28
[52] U.S. Cl. ...................... 294/88; 294/115; 294/907; 901/37
[58] Field of Search ............ 294/88, 106, 115, 116, 294/907; 901/36, 37, 46; 92/129

[56] References Cited

U.S. PATENT DOCUMENTS

| | | | |
|---|---|---|---|
| 3,734,556 | 5/1973 | Misawa | 294/88 |
| 4,037,730 | 7/1977 | Fetzer . | |
| 4,607,873 | 8/1986 | Nusbaumer et al. | 294/88 |
| 4,729,588 | 3/1988 | Kratzer | 294/88 |
| 4,730,861 | 3/1988 | Spencer | 294/907 X |
| 4,874,194 | 10/1989 | Borcea et al. | 901/37 X |
| 4,913,481 | 4/1990 | Chin et al. | 294/88 |
| 4,944,215 | 7/1990 | Nimmo et al. | 92/170.1 X |
| 5,040,836 | 8/1991 | Roudaut | 294/88 |

FOREIGN PATENT DOCUMENTS

| | | |
|---|---|---|
| 0368777 | 5/1990 | European Pat. Off. . |
| 1295972 | 12/1962 | France . |
| 2041263 | 9/1980 | United Kingdom . |

*Primary Examiner*—Dean J. Kramer
*Attorney, Agent, or Firm*—Laff, Whitesel, Conte & Saret, Ltd.

[57] ABSTRACT

The invention relates to a pneumatic prehension device or pincers constituted by a body pierced with a cylinder-forming boring inside which a piston can slide under the action of pressurized air. Two fingers are movably mounted on the body so that they can assume all of the positions found between an extreme open position and an extreme closed position. A shackle comprises a governing mechanism for opening and closing of the fingers. When it slides, the piston is capable of driving the shackle in translation so as to govern the opening or the closing of the fingers. The shackle (12) has a cylindrical head (13) provided to slide and be guided inside a bore (3), the axis of which is the same at the axis of bore (2) that receives piston (5). The shackle also comprises a coaxial rod (17) at the end of which piston (5) is assembled with radial play.

13 Claims, 2 Drawing Sheets

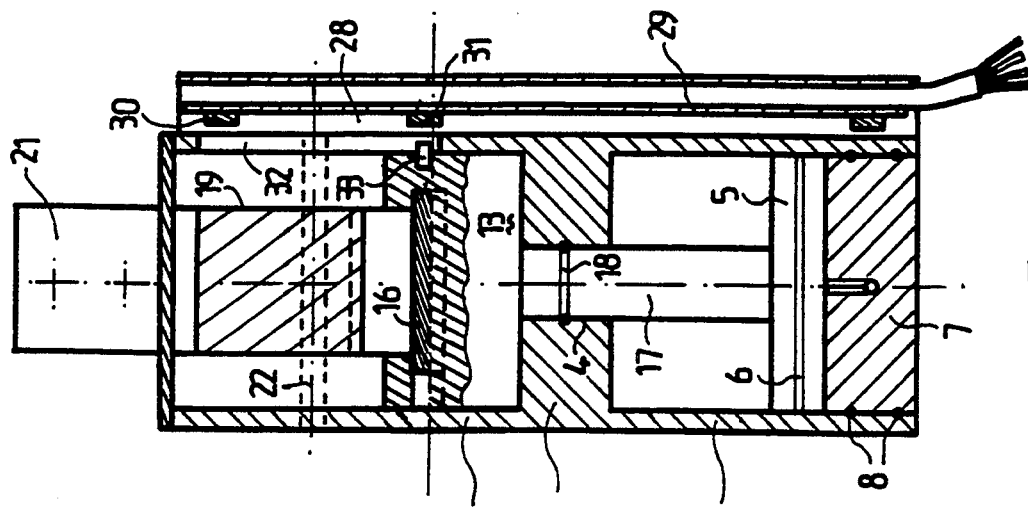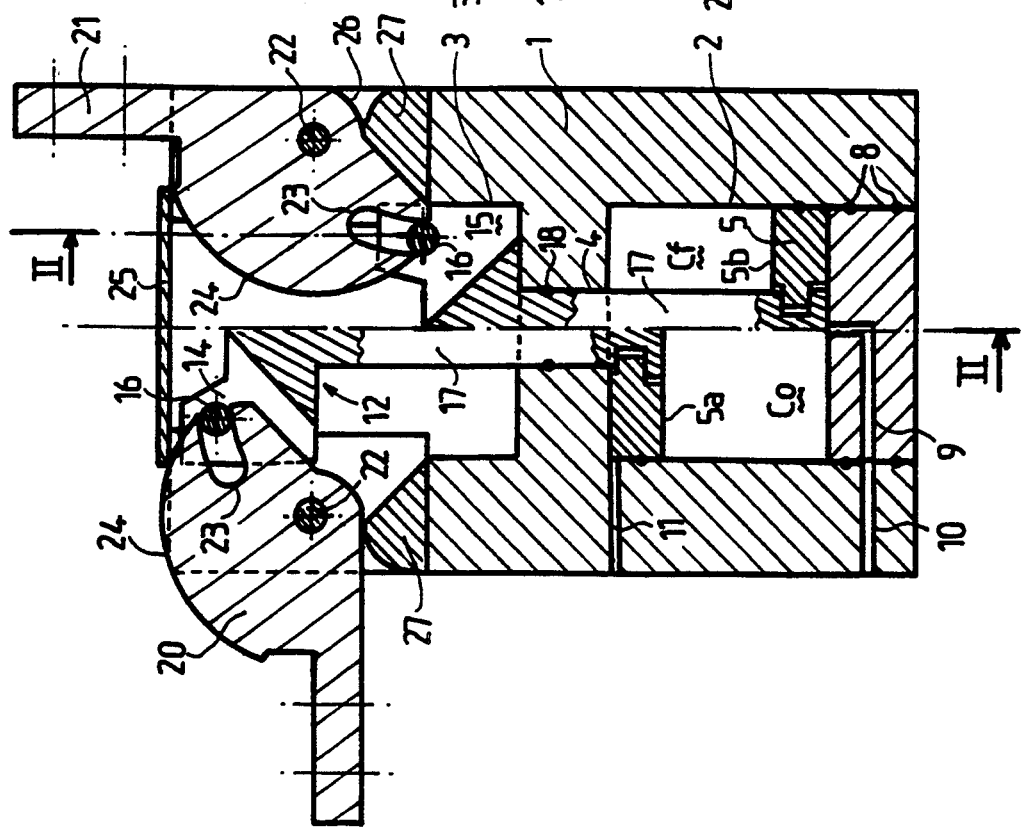

PNEUMATIC PINCERS

The present invention relates to a pneumatic prehension device or pincers and, more especially, to an improvement to a pneumatic prehension device of the type with pivoting fingers. Such pincers may be used, especially in the field of automation, to perform parts transfer operations.

Such prehension devices are already known and there will be mentioned, as examples, the patent documents FR-A-2 592 827 and EP-A-368 777. The prehension device described in this latter document essentially comprises a jack or thrustor body inside which a piston drives a thrustor rod. In the latter, at its end that faces the end of the piston, there is found a maneuver part hereafter called "shackle" because of its shape. It can actuate two fingers that pivot along axes perpendicular to the axis of the thrustor body.

In sliding from one end to the other end inside the thrustor body, the piston governs the opening or the closing of the fingers. The piston slides under the action of pressurized air that is introduced into the thrustor body and that acts either on one face of the piston or on its other face. The intake of air into the thrustor body governs the squeezing of the part or object at the time the fingers touch that part.

On the fingers of the prehension devices or pincers, there are clamping jaws which are adapted to the parts to be handled. The parts may have complex shapes. It often happens that the two fingers of a prehension device do not work in the same manner. It also happens, at times, that one finger is blocked in a fixed position and exerts a force of reaction on the part to be held tightly, the other one alone exerting the pinching or squeezing force.

Now, in cases of marked asymmetry, the piston rod that drives the fingers is subjected to such a strong stress it breaks.

One of the purposes of the present invention is to remedy that drawback.

It has been observed that, in these special cases, the rod is subjected to radial forces that are not compensated, and that these forces were responsible for its breaking. In certain cases with less marked asymmetrical forces, the rod may become wedged inside its lodging, causing a blocking of the prehension device or pincers.

Besides, there may be an abnormal wear of the piston and of the cylinder inside which it slides, this causing internal leaks of the pressurized air and, consequently, a weaker pinching or squeezing forces.

The present invention also has as one of its purposes to remedy this drawback.

It has been observed that this latter phenomenon occurs because the piston plays a part in the axial guiding of the rod and of the finger maneuver part.

The present invention therefore has as one of its main purposes to offer a prehension device or pincers capable of operating without any breaking of the rod, and in which neither the piston nor the cylinder wear abnormally, under asymmetrical conditions of use.

To that end and according to a first characteristic of the invention, the shackle has a cylinder capable of sliding and being guided inside a bore of the same axis as the bore that receives the piston, and also has a coaxial rod at the end of which the piston is assembled with radial play.

Thus, in the case of asymmetrical use of the prehension tool or pincers, the radial forces that are developed are transferred to the head of the shackle. The rod is relieved of these stresses and therefore no longer breaks. Besides, the rod no longer become slanted and no longer becomes wedged inside its bore. Finally, the piston assembled with play no longer receives radial forces, so that the piston and its bore no longer show abnormal wear, and no longer become out of round.

According to another characteristic of the invention, each one of the above-mentioned fingers is arranged so that it can pivot around a transverse shaft. The driving mechanism of the shackle comprises, for each finger, a shaft that is carried by the shackle, that shaft being devised such that it can engage in a groove of the finger, in order to drive the latter into rotation when the shackle slides inside its own bore.

According to another characteristic of the invention, the rod of the cap or cover is guided in translation inside a bore, this making it possible for it further to increase the guiding length on the shaft.

According to another characteristic of the invention, each finger has an internal arcuate face, the center of which is superposed to its pivoting shaft. A static joint fixed on the body constantly rests on that face, whatever may be the position of the finger.

Likewise, the external face of each finger comprises an arcuately shaped part, the center of which is superposed on its pivoting shaft. A static joint fixed on the body comprising a lip that is constantly in contact with said face.

According to another characteristic of the invention, the head is equipped with a small radial permanent magnetic rod projecting from its lateral surface, and arranged so that it lodges itself inside a groove on the internal surface of the shackle bore that opens to the outside of that body. The small permanent magnet rod running over the length of the above-mentioned groove when the shackle and the piston slide inside their respective bore. Magnetic sensors are provided on the outside of the body, facing the ends of the above-mentioned groove, to detect the magnetic field emanating from the above-mentioned small rod.

The characteristics of the invention indicated above, as well as others, will appear more clearly upon a reading of the following description of one embodiment, that description being given in relation to the attached drawing in which:

FIG. 1 is a section view of an example of an embodiment of a prehension device or pincers according to the invention, FIG. 2 is a section view along the broken plane II/II in FIG. 1; and FIG. 3 shows the guiding shackle in perspective.

The present description is given in relation to the FIGS. 1 and 2. The prehension device or pincers shown in these figures essentially comprises a body 1, longitudinally pierced, at each of its ends, with two coaxial blind bores 2 and 3 in communication with each other, through their respective bottoms, by means of a third bore 4, which is coaxial with the two first bores, 2 and 3.

A piston 5 slides inside bore 2 that forms a cylinder for that piston. That piston has, on its periphery, an O-ring or other ring-shaped tightness joint 6. Bore 2 is closed by a cover 7 equipped, on its periphery, with O-rings or other ring-shaped tightness joints 8. The internal surface of the bore 2 forms, with the face 5a of piston 5 on the side of lid 7, a second chamber Cf. The cover 7 is pierced with an air intake channel 9 that opens, though one of its ends, into the first chamber Co and, through its other end, into a corresponding channel 10 inside the body to come and open, by one of its ends, into the second chamber Cf.

A shackle 12 has a cylindrical head 13 that can slide inside bore 3. Head 13 is slit, on each side by two bevelled cuts-outs forming, on each one of them, a fork carrying a shaft 16 perpendicular to the longitudinal main shaft of the shackle 12.

The shackle 12 also comprises a rod 17 inside the longitudinal axis of shackle 12, arranged so as to slide inside bore 4. An O-ring or other ring-shaped tightness joint 18 is provided in the bore 4, in contact with the periphery of rod 17.

Piston 5 is mounted, with radial play, at the end of rod 17 of shackle 12.

Shackle 12 is guided in translation by its head 13 and its shaft 17 inside borings 3 and 4, respectively. The piston 5 does not ensure any guiding function for the set comprising the head (13) and the rod (17), because head 13 is mounted with a radial play on the rod (17). It is the head (13) which provides the guiding function. The head (13) is guided in translation within the bore 3. With such an assembly, radial forces exerted on cap or cover 13 are transferred to head 13 but to rod 17, and not to piston 5. The result is that bore 2 which forms the cylinder, and piston 5, are not damaged by such radial forces. Besides, stress upon rod 17 is relieved by head 13 and no longer breaks under the effect of these radial forces.

Piston 5 plays a motor or driving part. Indeed, when pressurized air is introduced through channel 10, the chamber Co sees its volume increase, thus pushing piston 5 toward the bottom of bore 2. If, on the contrary, pressurized air is introduced through channel 11, it is chamber Cf that sees its volume increase, thus pushing piston 5 toward lid 7. Piston 5, by sliding inside bore 2, drives shackle 12 in a translation motion.

It will be noted that rod 17 has a length such that, when piston 5 is in the low position shown to the right of the median axis in FIG. 1, the shackle 2 is approximately at the bottom of bore 3.

Body 1 is slit with a transverse notch 19 into which there come to be lodged two fingers 20 and 21 which are pivotally mounted on shafts 22 carried by the body 1. Each finger 20, 21 has an arcuate groove 23, which receive the shafts 16 carried by shackle 12. The assembly formed by the grooves 14, 15, the shafts 16 and the grooves 23 of fingers 20, 21, constitutes a mechanism for driving the fingers in rotation. Indeed, when the shackle 12 moves from an extreme low position shown to the right of the axis in FIG. 1, toward an extreme high position shown on the left of the axis in that same Figure, or conversely, the fingers 20, 21 pivot around their shafts 22 from an extreme closure position to an extreme open position, or conversely, as they are being driven by the respective shafts 16 moving groove 23.

Thus, it will be understood that by introducing pressurized air through channel 10, the fingers 20, 21 are opened, while air introduced through channel 11, closes the fingers.

Each finger 20, 21 has its internal arcuate surface 24, superposed to its pivoting shaft 22. A static joint 25 is fixed, by any suitable means, to the upper edge of body 2. It will constantly rest on the arcuate surface 24 of each finger 20, 21, whatever may be its opening position.

Likewise, the external face of each finger 20, 21 comprises an arcuate part 26 with its center superposed on its pivoting shaft. A static joint 27 fixed to body 1 comprises a lip that is constantly in contact with said part 26.

The joints 25 and 27 thus ensure a tightness against dust for the driving mechanism of fingers 20, 21.

Body 1 has a longitudinal groove 28 inside which there is mounted a printed circuit card 29 for the driving and controlling of the prehension device or pincers. Such a card is described, for example, in the patent document FR-A-2-651 515. It is connected to a driving unit inside which there are programmed the different sequences of opening and closing of the finger. On that card are mounted two or more linear magnetic sensors 30 and 31, of the Hall Effect type for example. The sensors 30 and 31 are mounted facing the ends of a groove 32 parallel to the longitudinal axis of the prehension tool and that opens on one side inside boring 3 and, on the other side, on the outside of body 1 in groove 28. A permanent magnet formed by a small rod 33 is mounted radially on the external surface of head 13 of the shackle 12. It is arranged in groove 32 to run over the entire length of that groove 32 when the shackle 13 slides between its two extreme positions.

It will be noted that the influence of magnet 33 on the sensors 30 and 31 occurs directly and without any material other than air between them, this having the advantage of increasing the amplitude of the signal delivered by the sensors 30 and 31, as well as the precision of the measurement thus performed. That result was not possible with the prehension devices or pincers of the prior art, since the magnet was mounted on the piston of the driving mechanism of the fingers and since, the piston itself being mounted tightly in its bore, it was not possible to provide for a groove such as groove 32.

In the known prehension devices or pincers, the magnet on the piston attracts magnetic dusts that, agglomerated by magnetism, contribute to the wear of the piston and of its bore. That phenomenon cannot take place with the prehension devices or pincers of the present invention since the piston does not comprise a magnet.

Finally, the mounting a small magnetic rod 33 instead of a generally utilized magnetic ring, makes it possible greatly to reduce the quantity of magnetic dust that adheres on the external walls of the prehension device or pincers.

Let us note that the prehension device or pincers according to the invention may be equipped with controls connected to the channels 9, 10 and 11 for controlling the distribution of pressurized air to the pincers. Such controls may be of the type of those described in patent document Fr-A-2 638 670. They may be mounted on lid 7.

I claim:

1. A pneumatic prehension device or pincers comprising a cylindrical head (13), a piston (5), a body (1) pierced with a cylinder-forming bore (2) in which said piston slides responsive to pressurized air within said cylinder (2) and acting upon said piston (5), two fingers (20, 21) movably mounted on said body (1) to assume any position between an extreme opening position and an extreme closing position, a shackle (12) provided with a control mechanism for governing the opening and the closing of said fingers (20, 21), said piston (5) being coupled to drive said shackle in response to said piston sliding in said bore (2), so as to control either a finger opening or a finger closing, said shackle (12) including said cylindrical head (13) supporting said control mechanism and mounted to slide and be guided inside a bore (3), so as to compensate for a resulting force of the radial forces exerted by said mechanism on said fingers, said forces being generated when said fingers squeeze a piece, and a coaxial rod (17) having an end linked to said cylindrical head (13) and another end for supporting said piston (5) with radial play between said coaxial rod (17) and said piston (5), said cylinder head having an axis which is the same as an axis of said bore (2) that receives piston (5).

2. A pneumatic prehension device or pincers according to claim 1, wherein each one of said fingers (20, 21) is mounted to pivot around a transverse pivot shaft (22), said shackle (12) comprising a pair of shafts (16) that are carried by said shackle (12), said shafts (16) being individually associated with said fingers (20, 21), said shafts being perpendicular to the longitudinal axis of said shackle (12), a groove (23) in each of said fingers (20, 21) for engaging its said individually associated shaft 16 in order to drive the fingers in rotation when the shackle (12) slides inside its bore (3).

3. A prehension device or pincers according to either claim 1 or claim 2, wherein the rod (17) of the shackle (12) is guided in translation inside a bore (4).

4. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein each one of said fingers (20, 21) is mounted to pivot around a transverse pivot shaft (22), said shackle (12) comprising a pair of shafts (16) that are carried by said shackle (12), said shafts (16) being individually associated with said fingers (20, 21), said shafts being perpendicular to the longitudinal axis of said shackle (12), a groove (23) in each of said fingers (20, 21) for engaging said individually associated shaft 16 in order to drive the fingers in rotation when the shackle (12) slides inside its bore (3), wherein each finger (20, 21) has an internal arcuate face (24), with its center rotatably supported on said transverse shaft (22), and a static joint (25) fixed on the body (1) to constantly rest on said arcuate face (24) regardless of the position of said finger (20, 21).

5. A prehension device or pincers according to claim 4 wherein an external face (26) of each finger (20, 21) comprises an arcuate part (26), the center of each of said parts (26) being supported on an individually associated pivot shaft (22), and a static joint (27) fixed on body (1) having a lip in constant contact with said part (26).

6. A prehension device or pincer according to claim 4 wherein a head (13) has a projection on a lateral face, with a small radial permanent magnet rod (33) which may lodge itself inside a groove (32) on an internal surface of the bore (3) of the shackle (12), said small magnetic rod (33) running over the entire length of said groove (32) when the shackle (12) and the piston (5) are sliding in their respective bores (2 and 3), magnetic sensors (30 and 31) on the outside of body (1) facing the ends of said groove (32) for detecting the magnetic field emanating from said small rod (33).

7. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein each one of said fingers (20, 21) is mounted to pivot around a transverse pivot shaft (22), said shackle (12) comprising a pair of shafts (16) that are carried by said shackle (12), said shafts (16) being individually associated with said fingers (20, 21), said shafts being perpendicular to the longitudinal axis of said shackle (12), a groove (23) in each of said fingers (20, 21) for engaging its said individually associated shaft 16 in order to drive the fingers in rotation when the shackle (12) slides inside its bore (3), wherein an external face (26) of each finger (20, 21) comprises an arcuate part (26), the center of each of said parts (26) being supported on an individually associated pivot shaft (22), and a static joint (27) fixed on body (1) having a lip in constant contact with said part (26).

8. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, head (13) having a projection on a lateral face, with a small radial permanent magnet rod (33) which may lodge itself inside a groove (32) on an internal surface of the bore (3) of the shackle (12), said small magnetic rod (33) running over the entire length of said groove (32) when the shackle (12) and the piston (5) are sliding in their respective bores (2 and 3), magnetic sensors (30 and 31) on the outside of body (1) facing the ends of said groove (32) for detecting the magnetic field emanating from said small rod (33).

9. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein each one of said fingers (20, 21) is mounted to pivot around a transverse pivot shaft (22), said shackle (12) comprising a pair of shafts (16) that are carried by said shackle (12), said shafts (16) being individually associated with said fingers (20, 21), said shafts being perpendicular to the longitudinal axis of said shackle (12), a groove (23) in each of said fingers (20, 21) for engaging said individually associated shaft 16 in order to drive the fingers in rotation when the shackle (12) slides inside its bore (3), wherein the rod (17) of the shackle (12) is guided in translation inside a bore (4), and wherein each finger (20, 21) has an internal arcuate face (24) with its center rotatably supported on said transverse shaft (22), and a static joint (25) fixed on the body (1) to constantly rest on said arcuate face (24) regardless of the position of said finger (20, 21).

10. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein each one of said fingers (20, 21) is mounted to pivot around a transverse pivot shaft (22), said shackle (12) comprising a pair of shafts (16) that are carried by said shackle (12), said shafts (16) that are carried by said shackle (12) said shaft (16) being individually associated with said fingers (20, 21), said shafts being perpendicular to the longitudinal axis of said shackle (12), a groove (23) in each of said fingers (20, 21) for engaging said individually associated shaft 16 in order to drive the fingers in rotation when the shackle (12) slides inside its bore (3), wherein the rod (17) of the shackle (12) is guided in translation inside a bore (4), and wherein an external face (26) of each finger (20, 21) comprises an arcuate part (26), the center of each of said parts (26) being supported on an individually associated pivot shaft (22), and a static joint (27) fixed on body (1) having a lip in constant contact with said part (26).

11. A pneumatic prehension device on pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein each one of said fingers (20, 21) is mounted to pivot around a transverse pivot shaft (22), said shackle (12) comprising a pair of shafts (16) that are carried by said shackle (12), said shafts (16) that are carried by said shackle (12) said shaft (16) being individually associated with said fingers (20, 21), said shafts being perpendicular to the longitudinal axis of said shackle (12), a groove (23) in each of said fingers (20, 21) for engaging said individually associated shaft 16 in order to drive the fingers in rotation when the shackle (12) slides inside its bore (3), wherein a head (13) has a projection on a lateral face, with a small radial permanent magnet rod (33) which may lodge itself inside a groove (32) on an internal surface of the bore (3) of the shackle (12), said small magnetic rod (33) running over the entire length of said groove (32) when the shackle (12) and the piston (5) are sliding in their respective bores (2 and 3), magnetic sensors (30 and 31) on the outside of body (1) facing the ends of said groove (32) for detecting the magnetic field emanating from said small rod (33).

12. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein the rod (17) of the shackle (12) is guided in translation inside a bore (4), and wherein each finger (20, 21) has an internal arcuate face (24) with its center rotatably supported on said transverse shaft (22), and a static joint (25) fixed on the body (1) to constantly rest on said arcuate face (24) regardless of the position of said finger (20, 21).

13. A pneumatic prehension device or pincers constituted by a body (1) pierced with a cylinder-forming bore in which a piston slides responsive to the action of pressurized air, two fingers (20, 21) movably mounted on said body (1) to assume any position between an extreme opening position and an extreme closing position, a shackle (12) comprising a mechanism for governing the opening and the closing of said fingers, said piston being coupled to drive said shackle in response to said piston sliding in said bore, so as to govern the opening or the closing of said fingers, said shackle (12) comprising a cylindrical head (13) mounted to slide and be guided inside said bore (3), the axis of said cylinder head being the same as the axis of said bore (2) that receives piston (5), a coaxial rod (17) having an end which supports said piston (5) with radial play, wherein the rod (17) of the shackle (12) is guided in translation inside a bore (4), and wherein an external face (26) of each finger (20, 21) comprises an arcuate part (26), the center of each of said parts (26) being supported on an individually associated pivot shaft (22), and a static joint (27) fixed on body (1) having a lip in constant contact with said part (26).

* * * * *